United States Patent [19]
Schnizlein et al.

[11] Patent Number: 5,257,360
[45] Date of Patent: Oct. 26, 1993

[54] RE-CONFIGURABLE BLOCK LENGTH CACHE

[75] Inventors: Paul G. Schnizlein; Donald M. Walters, Jr., both of Austin, Tex.

[73] Assignee: Advanced Micro Devices, Inc., Austin, Tex.

[21] Appl. No.: 497,967

[22] Filed: Mar. 23, 1990

[51] Int. Cl.⁵ .................. G06F 12/00; G06F 12/06; G11C 8/00
[52] U.S. Cl. ................... 395/425; 364/DIG. 1; 364/243.42; 364/245; 365/230.03
[58] Field of Search .......... 365/230.03, 49, 189.01, 365/230.06, 230.01; 395/425; 364/DIG. 1, DIG. 2, 243.41, 243.42, 243.6, 245, 245.4, 261.5, 261.3, 263.1

[56] References Cited

U.S. PATENT DOCUMENTS

| | | | |
|---|---|---|---|
| 4,315,312 | 2/1982 | Schmidt | 364/200 |
| 4,626,988 | 12/1986 | George | 369/200 |
| 4,725,945 | 2/1988 | Kronstadt et al. | 364/200 |
| 4,791,607 | 12/1988 | Igarashi et al. | 365/51 |
| 4,811,209 | 3/1989 | Rubinstein | 364/200 |
| 4,811,297 | 3/1989 | Ogawa | 365/230.03 X |
| 4,847,758 | 7/1989 | Olson et al. | 364/200 |
| 4,894,772 | 1/1990 | Langendorf | 364/200 |
| 4,905,188 | 2/1990 | Chuang et al. | 364/900 |
| 4,907,203 | 3/1990 | Wada et al. | 365/230.03 X |
| 4,924,376 | 5/1990 | Ooi | 364/200 |
| 4,942,520 | 7/1990 | Langendorf | 364/200 |
| 4,945,513 | 7/1990 | Ueda | 365/51 |
| 5,014,195 | 5/1991 | Farrell et al. | 364/200 |
| 5,040,153 | 8/1991 | Fung et al. | 364/200 |
| 5,091,851 | 2/1992 | Shelton | 395/425 |

Primary Examiner—Alyssa H. Bowler
Attorney, Agent, or Firm—Foley & Lardner

[57] ABSTRACT

A cache organizational signal ("CORG signal") selects between cache organizations. A cache organization is chosen according to the speed of the main memory that is paired with the cache to handle different size blocks of instructions. When the CORG signal organizes the cache to handle blocks having few instructions per block, many blocks are present and a higher hit rate occurs, which works well with a fast main memory. When the CORG signal organizes the cache to handle blocks having more instructions per block, fewer blocks are present, a lower hit rate occurs, and processor idle cycles decrease, which works well with a slower main memory.

6 Claims, 4 Drawing Sheets

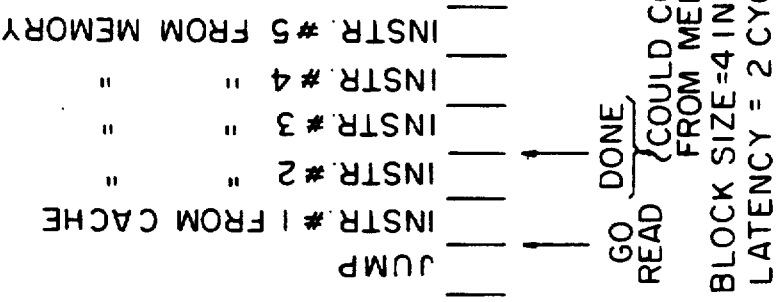
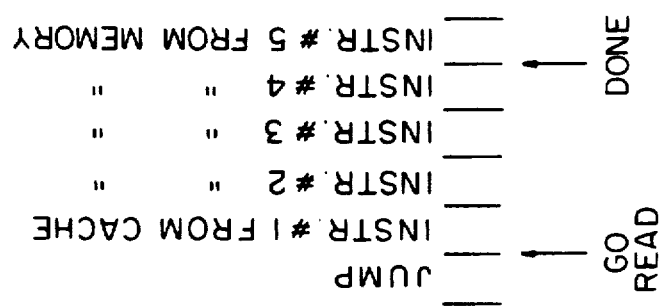
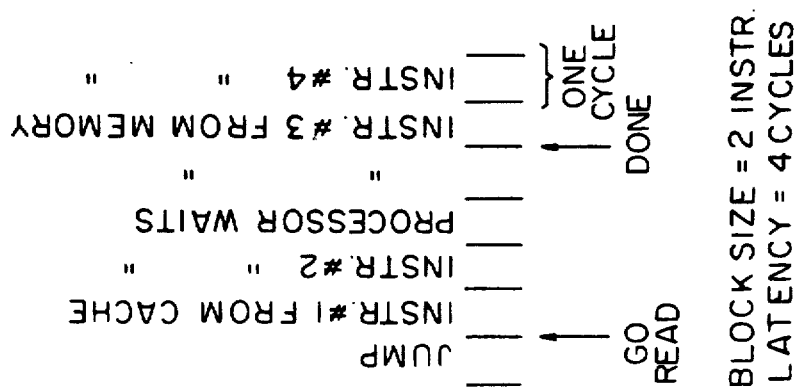

RE-CONFIGURABLE BLOCK LENGTH CACHE

FIELD OF THE INVENTION

The invention concerns computer hardware, and specifically concerns a branch target cache for storing branch target instructions.

BACKGROUND OF THE INVENTION

A cache is a buffer that holds information from a main memory for quick access by a processor. A branch target cache (BTC) is a cache designed to hold groups of branch target instructions which would come into play in the event of a branch, such as a jump instruction, in the program. When such branch instructions occur, the target instructions need to be fetched from a new place in the processor main memory, and the processor must wait for the target instructions to arrive after a read cycle to main memory. The BTC stores several instructions for each of various branch targets so that the processor may be kept busy during the main memory read cycles during which time it would normally be idle.

Generally speaking, a processor can access information from a cache memory in 20 to 50 nanoseconds, but takes 200 to 500 nanoseconds to access information from a main memory. Thus, by storing blocks of most frequently used branch target instructions, with each instruction block containing instructions immediately following and including the target instruction, processor idle time can be greatly reduced.

The efficiency of a cache is determined by the success rate of the processor in finding or "hitting" information within the cache, and the time spent in accessing the cache in the case of a "hit". The cache, however, has limited memory locations for storing information comprising blocks of instructions. If the cache is organized to hold many blocks containing few instructions per block, the success rate of hitting information within the cache increases, but the number of instructions fetched from cache for each hit is relatively small. In this case, processing is most efficient with a fast main memory, so that instructions following those stored in the BTC will be quickly available after depletion of the cache instructions. Idle cycles increase with a slower main memory.

The particular processor idle time problem addressed in the invention may be seen more clearly in reference to FIGS. 1A-1B and 2A-2C which set forth a simple example of block length configurations and latency in order to facilitate understanding of the problem and the solution offered by the invention.

FIG. 1A illustrates part of a BTC organized in groups of 4-instruction blocks. Only two such blocks are shown for simplicity. FIG. 1B illustrates an organization of 2 instructions in each of 4 blocks. Note that the total memory capacity, 8 instructions, is the same in both cases. In comparing the cache organization of FIGS. 1A and 1B, it may be appreciated that when the cache is organized to hold fewer blocks containing more instructions per block, (FIG. 1A), the success rate of hitting information decreases, but processor idle cycles also decrease since more instructions are fetched from the BTC with each hit. In this case, processing is most efficient with a slower main memory. A fast memory would under-utilize locations in the cache.

FIGS. 2A-2C illustrate memory latency for different fixed organizations of instruction blocks stored in cache locations. In each case, the block size is known to the main memory and the correct next instruction is requested from memory after the instructions of the block have been examined.

FIG. 2A illustrates a long memory latency compared to the number of instructions organized in a block. Here, each block comprises 2 instructions and latency is 4 cycles. In response to a "jump" command, the processor searches the blocks of the BTC looking for a match of the jump target instruction. The cache supplies the first two instructions, but the processor must then idle, waiting for the next group of instructions from main memory. In the example of FIG. 2A, the memory latency period is four cycles so that the processor is idle for two cycles waiting for instructions from main memory.

FIG. 2B illustrates a memory latency that matches the number of instructions organized in a block, the ideal case. Here, each block comprises 4 instructions and the latency period is again 4 cycles. The processor receives information at a rate that is equal to the ability of the processor to use the information, and to fetch additional instructions from main memory. These additional instructions from main memory are supplied just in time to the processor without any idling cycles after execution of the four instructions retrieved from the BTC.

FIG. 2C illustrates a short memory latency period compared to the number of instructions in a block. Here, each block comprises 4 instructions and the latency period is 2 cycles. In this case, the main memory has supplied instructions to the processor before the processor has completed execution of the instructions from the BTC. The third and fourth instructions retrieved form the BTC could have been supplied by the main memory directly to the processor. The locations occupied by these third and fourth instructions could have been used to hold instructions for other branches.

Accordingly, a cache is needed that will overcome problems of memory latency and function efficiently with either fast or slow main memories.

SUMMARY OF THE INVENTION

The invention concerns a cache having a cache memory for storing a plurality of data words, such as, instruction words in blocks of memory. The cache has a mechanism for selecting between a first cache organization defining a first block having a first number of instructions and a second cache organization defining a second block having a second number of instructions different than the first number of instructions. The cache utilizes a cache organization signal that indicates cache selection. The number of instructions in the block depends upon the selected cache organization.

The specification describes an embodiment of the invention in which a cache has selectable organization. The cache is organized so that the number of instructions in a block is selected to match the speed of the main memory that is paired with the cache.

BRIEF DESCRIPTION OF THE DRAWINGS

The invention is described in relation to the preferred embodiment set forth below taken in relation to the drawings in which:

FIGS. 2A–2C illustrate examples of memory latency and block size;

DETAILED DESCRIPTION OF THE PREFERRED EMBODIMENTS

Figure 3:
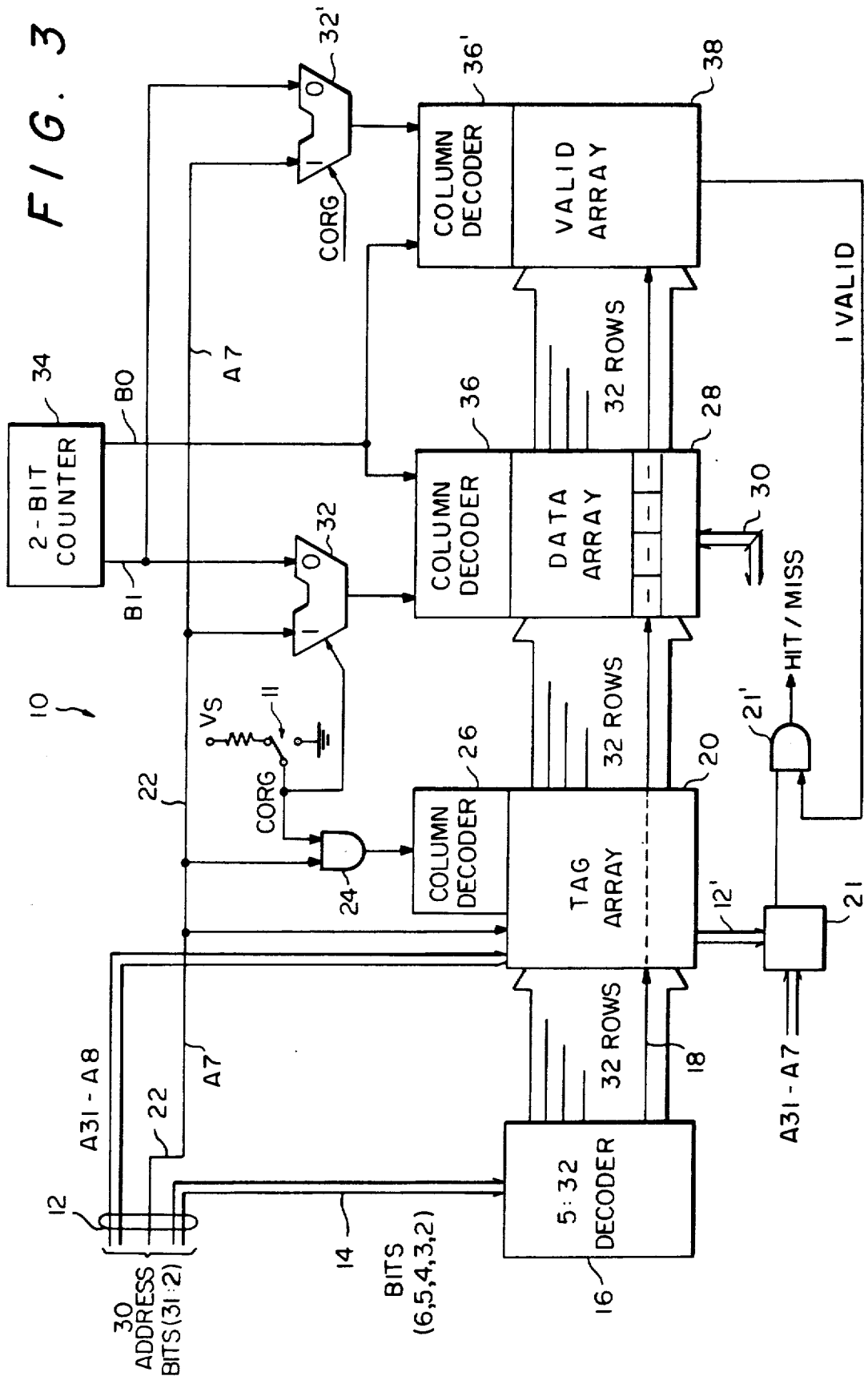
FIG. 3 is a schematic diagram showing a cache having selectable organization.

FIG. 3 is a schematic diagram of a cache 10 which is reconfigurable in its block length in accordance with the invention. A cache organizational signal ("CORG signal") is operative to select between cache organizations and is chosen according to the speed of the main memory that is paired with the cache 10. The CORG signal may, for example, be generated from a user settable switch 11 providing an input to the cache 10 as shown, or may be set in software at the factory when the system is configured utilizing, for example, the system configuration register.

Figure 1A:
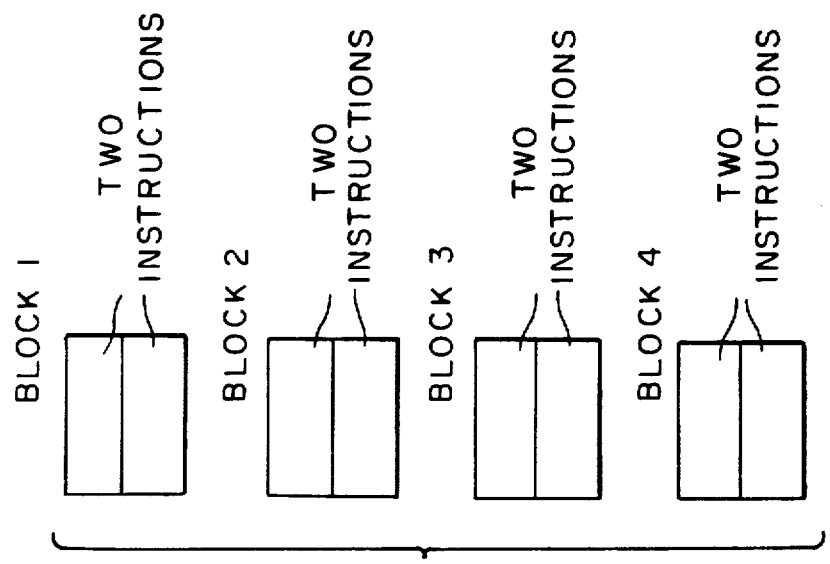
FIGS. 1A and 1B illustrate different block sizes having different numbers of instructions per block in branch target cache.
Figure 1B:
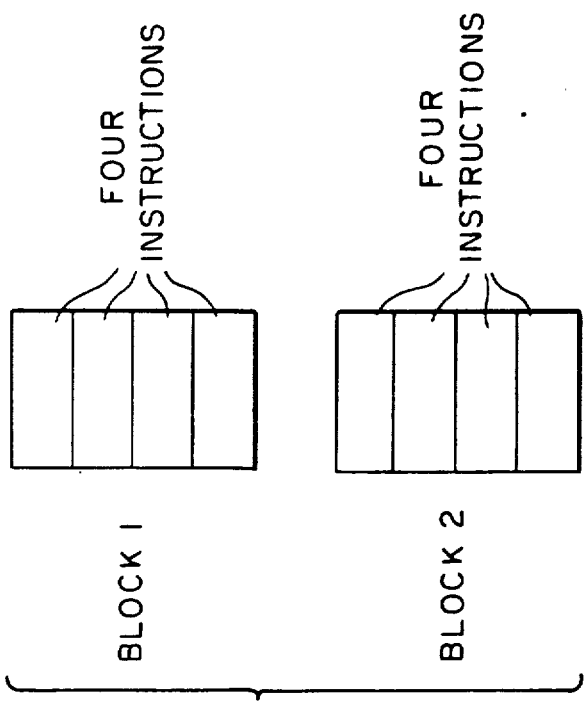

In the example given in FIG. 3, the CORG signal selects between two organizations of the cache 10. When CORG is a logical 0, the cache is organized with 4 instruction words per block, and when CORG is a logical 1, the cache is organized with 2 instruction words per block. These two organizations are illustrated in FIGS. 1A and 1B respectively. When the CORG signal organizes the cache 10 to handle blocks having a few instructions per block, many blocks are present and a higher hit rate occurs, which works well with a fast main memory. Idle cycles would increase if such blocks are processed by a slow main memory. When the CORG signal organizes the cache 10 to handle blocks having more instructions per block, fewer blocks are present, a lower hit rate occurs, and processor idle cycles decrease, which works well with a slower main memory.

The cache 10 of FIG. 3 looks for an instruction at an address that is carried over a 30-bit wide address bus 12. Address bus 12 carries bits (A31 to A2) of the address. A 5-bit wide bus 14 carries a first portion of the address comprising bits (A6 to A2) to a row decoder 16. The decoder 16 is a 5-bit-to-32-line decoder. Accordingly, the row decoder 16 decodes the 5 bits (A6 to A2) of the address and produces a select signal 18 on only one output line of the row decoder 16 to a tag array 20. The tag array 20 stores information concerning the identification of instructions, e.g., their addresses, that are processed in the cache 10. The tag array 20 includes 32 rows, each of which corresponds to one line of the 32 output lines of the row decoder 20. In this manner, the select signal 18 is carried by the one line of the row decoder 16, and selects one row of the tag array 20.

The 30-bit wide address bus 12 also carries bits (A31 to A8) of the address to columns of the tag array 20. Address line A7 is also fed to the tag array 20. These lines are used as data input lines when storing addresses of the first instruction of a block. Data bus 12', having output lines D31–D7, serves as a data output bus which feeds the output of the tag array to a comparator 21. The address lines A31–A7 are also fed to comparator 21 which provides a "match" signal as an output whenever the address lines A31–A7 exactly coincide or match the data output lines D31–D7 representing bits stored in the tag array 20. The output of the comparator 21 is fed to an AND gate 21' which has its other input supplied from a valid array 38 discussed below. The output of the AND gate 21' provides the "hit" or "miss" signal to the processor indicating that the desired instruction block "is" or "is not" to be found in the cache data memory 28.

If CORG is set as "0", for example, the cache 10 is organized to handle blocks of information containing 4 instructions, as illustrated in FIG. 1A and described below. A separate line 22 carries a second portion of the address comprising bit (A7) to an AND gate 24. The AND gate 24 logically "ands" the bit (A7) signal with the cache organizational signal CORG. As long as CORG is "0", the output of AND gate 24 will be forced to produce a logical "0" at its output. The tag array 20 is configured in a 2×25 columns by 32 rows. Twenty five of the columns are used when CORG=0 and fifty of the columns are used when CORG=1. Thus, the "0" output of the AND gate 24 (corresponding to CORG=0) is fed to column decoder 26 of the tag array 20 and results in the selection of even numbered columns in the tag array 20, e.g., columns 0, 2, 4, etc. Thus, the tag array 20 uses only half of its columns, because there are only half as many blocks requiring stored address tags. The bit (A7) signal, however, enters a column of the tag array 20 in the manner of address bits (A31 to A8), since it is needed as an input to the tag array when CORG=0, as explained more fully below.

A data array 28 of the cache 10 stores the branch target instructions which it provides to the processor if there is a hit from the tag array 20. Data array 28 provides the processor these target instructions over a 32 bit instruction bus 30. This same instruction bus is used to load the data array with frequently used branch target instructions which are received from main memory under processor control. Thus, initially, when no branch target instructions are stored in the data array 28, all of the searches in the tag array 20 result in misses and cause the branch instructions (either in blocks of, for example, 4 or 2 depending on block configuration) to be retrieved from main memory to be subsequently loaded, via data bus 30, into the data array 28 for further reference.

The data array 28 comprises 4×32 columns and 32 rows. Any number of rows may in principle be used as this number merely corresponds to the number of blocks available and is a function of the memory capacity of the data array 28. The number of columns being 4×32 corresponds to each word being 32 bits wide and to a maximum block word capacity of 4 words per block. Thus in the case of 4 words per block, the data array 28 provides the first word by reading a bit from every fourth column of the data array 28 at a selected row determined from row decoder 16. For example, word one is read from a bit in column 0, 4, 8 etc. The second word is generated by reading a bit from the second and every subsequent fourth column again along the selected row designated from the row decoder 16, typically the same row as in the case of the first word since the words within a block are stored in consecutive storage locations. Thus, the second word is read from columns 1, 5, 9 etc. to obtain the second 32 bit word.

In reference to FIG. 3, a column decoder 36 is provided for selecting the various columns of the data array 28. Column decoder 36 receives a first input from 2-1-bit multiplexer 32 and a second input from a 2-bit counter 34, (labeled B0 in FIG. 3). Multiplexer 32 receives one input from the address signal A7, another input from the higher order output of counter 34, (labeled B1 in FIG. 3), and a select signal input supplied from the CORG signal. Thus CORG selects one of the multiplexer inputs and feeds the selected input to its output. The lower order output of counter 34, output B0, is fed directly to the column decoder 36. In the case where CORG is "0," and 4 instructions are stored per block, the multiplexer 32 passes the counter B1 signal to its output which is in turn fed to the column decoder 36 together with the lower order bit B0 of counter 34. When the counter is 0, columns 0, 4, 8, 12, etc are addressed at the selected row (from row decoder 16) and the resulting 32 bits are passed along bus 30 as the first branch instruction from the cache 10. When the counter moves to count 1, and columns, 1, 5, 9, 13, etc are accessed from the data array at the same selected row address as in the case of the first word, and the resulting 32 bit word is passed along bus 30 to the processor as the second word in the block. The process continues for counts 2 and 3 of the 2-bit counter 34 with columns 2, 6, 10, 14, etc and columns 3, 7, 11, 15 etc being read respectively to provide the third and fourth 32 bit words. A valid array 38 of the cache 10 is addressed in the same manner as the data array 28 and employs a 2-1-bit multiplexer 32' and a column decoder 36'. The valid array 38 holds a single validity bit corresponding to each instruction. The validity bit signifies whether or not the associated instruction is valid. The validity bit is sent to the AND gate 21' to condition a "hit" or "miss" together with the output of the tag array 20. The valid array 38 acts as an extension of the data array 28 in this respect.

If CORG is set as "1", the cache 10 is organized to handle blocks of information containing 2 instructions as illustrated in FIG. 1B. Now the data array 28 will hold twice as many blocks but only half as many words per block. The total memory capacity of the data array 28 obviously doesn't change. In this case, the CORG signal selects the A7 bit as an input to the column decoder 36 and does not pass the higher order B1 signal from the 2-bit counter 34. The lower order B0 signal is still passed to the decoder 36. As a result, the A7 bit is used to select between adjacent pairs of words whereas the B0 bit selects the word within each pair. For example, if A7 is a logical "0", columns 0 and 1 (and the column pairs 4, 5; 8, 9; 12, 13 etc.) may be designated by the counter B0 bit. Thus, when B0=0, columns 0, 4, 8, 12 etc. are accessed along the selected row line 18 (from row decoder 16) to generate the first 32-bit word; and when B0=1, columns 1, 5, 9, 13 etc. are accessed along the same selected row line 18 to generate the second 32-bit word. If A7=1, the second pair of columns are accessed. In this case, when B0=0, columns 2, 6, 10, 14 etc. are accessed to generate the first 32-bit word of the second block; and when B0=1, columns 3, 7, 11, 15 etc. are accessed to generate the second 32-bit word of the second block. As may be seen, twice as many blocks are available as compared to the case when CORG is "0", but each block contains only half as many words, giving the desired result.

The valid array 38 again functions as an extension of the data array 28 just as in the case when CORG was "0".

Now that CORG is "1", the value of A7 is passed through AND gate 24 to the column decoder 26 of the tag array 20. The tag array 20 uses the A7 bit as a column select signal. The bit A7 signal is redundantly stored as datum in the tag array 20. In this case such storage is redundant but was needed in the case of 4 words per block to yield just one tag per address.

Figure 4:
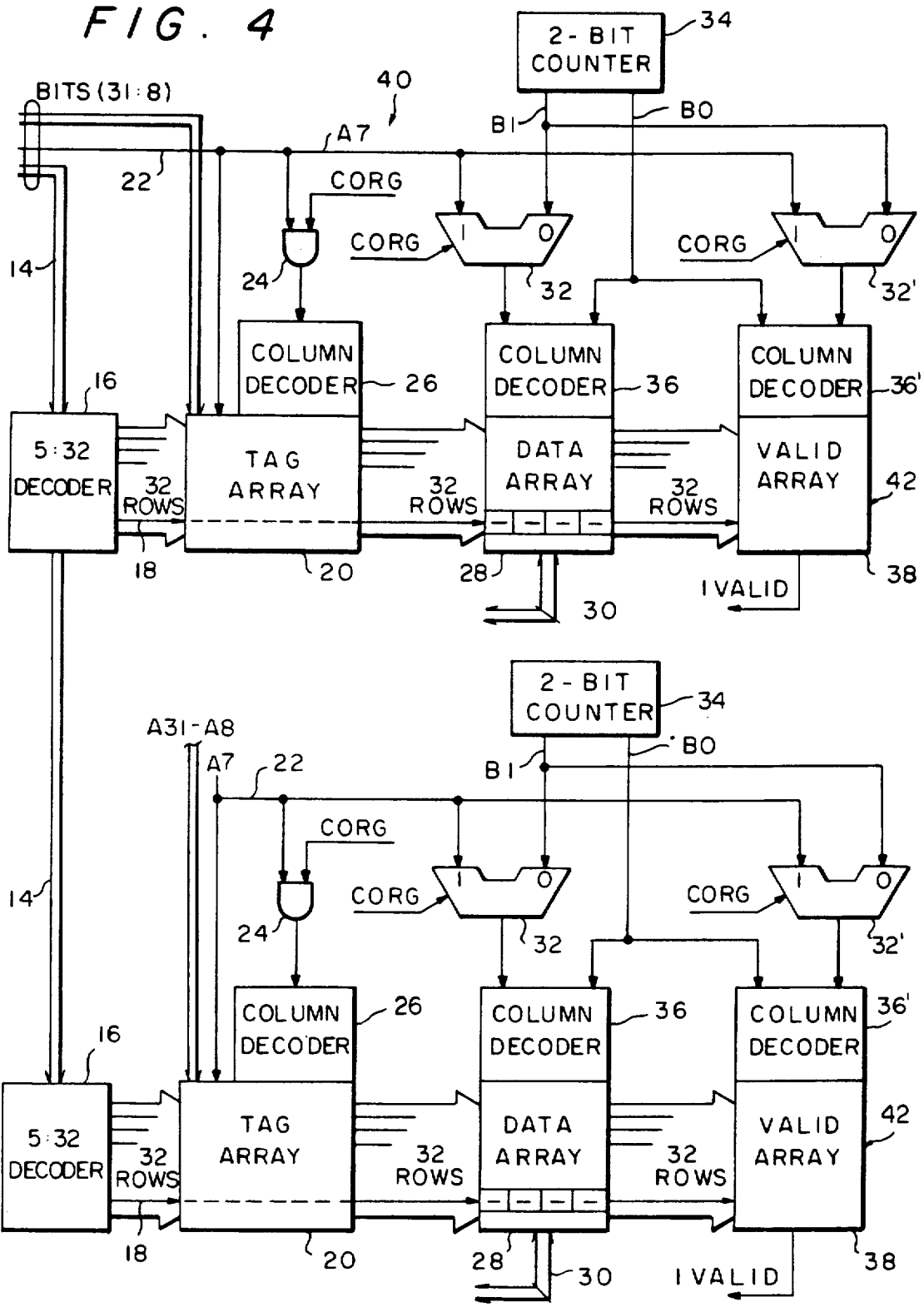
FIG. 4 is a schematic diagram showing a set-associative cache having selectable organization.

FIG. 4 shows another embodiment of the invention using a set-associative cache 40. In FIG. 4, a two-way set associative cache is shown but the same principles apply to a four-way set associative cache or, for that matter, to any number. The cache 40 comprises sets 42 of arrays. Each set 42 includes a tag array, data array and valid array just as in the case shown in FIG. 3, and is addressed in the same manner as the tag array 20, data array 28, and valid array 38. (The comparator 21 and logic gate 21' are not shown for simplicity.)

In the case of FIG. 4, each tag array 20 of each set is searched for a match and is "anded" with its associated validity bit to determine a hit or miss. The more sets in the cache, the greater the chances for a match.

Other embodiments of the invention are possible. The invention is not limited to instruction caches, but can be used in data caches also. In fact, the cache having selectable cache organization according to this invention can be used anywhere sequential locations of data are desired. The data, tag and valid arrays can comprise any number of rows and columns. A multiplexer larger than a 1-bit multiplexer and a counter larger than a 2-bit counter will provide more choices of cache organizations and will handle different block sizes. Caches having three, four or more choices of organization can be fabricated in accordance with the invention.

What is claimed is:

1. A cache comprising:
cache memory storage means for storing a plurality of data words such as instruction words;
means for receiving a cache organization signal; and
selecting means responsive to said cache organization signal and connected to said cache memory storage means for selecting between a first cache organization defining blocks of memory in said cache memory storage means having a first number of data words per block and a second cache organization defining blocks of memory in said cache memory storage means having a second number of data words per block, said second number being different than said first number and said data words having a constant word length, said selecting means including
a counter providing a plurality of output signals;
a multiplexer connected to receive at least some of said counter output signals and connected to receive said cache organization signal as a select signal thereto, said multiplexer producing an output signal; and
a decoder connected to receive said output signal from said multiplexer and connected to said cache memory storage means to access said data words in said first and second cache organizations.

2. The cache of claim 1, wherein said decoder provides address access signals to one of rows and columns of said cache memory storage means for accessing data words therein, and said cache further comprising an additional decoder connected to said cache memory storage means, said additional decoder providing address access signals to the other of said rows and columns of said cache memory storage means for accessing data words therein.

3. The cache as recited in claim 1 further comprising a validity data array, said validity data array storing at least one validity bit for each word in said cache memory storage means, said validity bit indicative of whether or not a corresponding data word in said cache memory storage means is valid or not.

4. A cache comprising:

cache memory storage means for storing a plurality of data rods such as instruction words;

means for receiving a cache organization signal; and means responsive to said cache organization signal and connected to said cache memory storage means for selecting between a first cache organization defining blocks of memory in said cache memory storage means having a first number of data words per block and a second cache organization defining blocks of memory in said cache memory storage means having a second number of data words per block, said second number being different than said first number and said data words having a constant word length, wherein some of said data words stored in said cache memory storage means are branch instructions and wherein a number of data words following a branch instruction matches a memory latency of a main memory from which additional instructions are fetched.

5. The cache of claim 4, wherein said data words have a constant bit length.

6. A method of using a branch target cache memory comprising the steps of:

receiving a select signal indicative of a memory latency of a main memory holding a plurality of branch target instructions;

selecting a selected configuration from one of a first and a second configuration in response to said select signal, said selected configuration indicating a number of blocks and a number or words per block, each of said blocks being loaded with a number of words per block corresponding to one of said plurality of branch target instructions, said first configuration having a first number of words per block, and said second configuration having a second number of words per block; and fetching upon execution of a branch instruction a desired number or words from a particular block in said branch target cache memory, said desired number of words being one of said first and second number of words according to said selected configuration such that an amount of time required to process said desired number of words matches said memory latency, said particular block corresponding to a branch target instruction associated with said branch instruction.

* * * * *